United States Patent [19]

Gellert

[11] Patent Number: 5,206,040
[45] Date of Patent: Apr. 27, 1993

[54] INJECTION MOLDING SEALING COLLAR WITH A CENTRAL HOT TIP SHAFT

[76] Inventor: Jobst U. Gellert, 7A Prince St., Georgetown, Ontario, Canada L7G 2X1

[21] Appl. No.: 835,501

[22] Filed: Feb. 14, 1992

[30] Foreign Application Priority Data

Dec. 11, 1991 [CA] Canada .................... 2057438

[51] Int. Cl.⁵ ................................. B29C 45/22
[52] U.S. Cl. ........................ 425/549; 264/297.2; 264/328.8; 264/328.15; 425/570; 425/572; 425/588
[58] Field of Search ............ 264/297.2, 328.8, 328.15; 425/549, 567, 570, 572, 588

[56] References Cited

U.S. PATENT DOCUMENTS

| | | | |
|---|---|---|---|
| 4,266,723 | 5/1981 | Osuna-Diaz | 425/549 |
| 4,279,588 | 7/1981 | Gellert | 425/549 |
| 4,303,382 | 12/1981 | Gellert | 425/566 |
| 4,450,999 | 5/1984 | Gellert | 425/549 |
| 4,810,184 | 3/1989 | Gellert et al. | 425/549 |
| 5,028,227 | 7/1991 | Gellert et al. | 425/549 |
| 5,141,696 | 8/1992 | Osuna-Diaz | 264/328.8 |

FOREIGN PATENT DOCUMENTS 1165525  4/1984  Canada .
1198266  12/1985  Canada .

Primary Examiner—Tim Heitbrink
Attorney, Agent, or Firm—Dalesman & Company

[57] ABSTRACT

This invention relates to a hot tip gated injection molding apparatus having a heated manifold to distribute melt to a number of spaced gates. An unheated sealing and conductive member is mounted directly between the heated manifold and the cooled cavity plate in alignment with each gate. The sealing and conductive member has an elongated hot tip shaft which is connected to extend centrally through the bore of an outer collar portion by a number of spaced spiral blades. The collar portion bridges an insulative air space between the hot manifold and cooled cavity plate to prevent melt leaking into it. Heat received through the rear end of the collar portion which abuts directly against the heated manifold is transferred through the blades and the hot tip shaft to the gate area which is aligned with the pointed forward end of the hot tip shaft. The rear end of the hot tip shaft extends rearwardly into a branch of the melt passage to pick up heat from the surrounding melt. The hot tip shaft has a highly conductive inner portion inside an abrasion resistant outer portion to conduct heat to and away from the gate area during different parts of the injection cycle. The spiral blades impart a swirling motion to the melt which flows between them.

8 Claims, 2 Drawing Sheets

INJECTION MOLDING SEALING COLLAR WITH A CENTRAL HOT TIP SHAFT

BACKGROUND OF THE INVENTION

This invention relates generally to injection molding and more particularly to injection molding apparatus having an unheated sealing and conductive member with a conductive hot tip shaft extending through an outer sealing collar mounted directly between a heated melt distribution manifold and a cooled cavity plate.

Multi-cavity hot runner injection molding systems require a heated melt distribution manifold in which the melt passage branches towards the various gates through the cooled cavity plate. It is well known in the art to mount nozzles or probes having an electrical heating element to extend from the heated manifold into the cooled cavity plate to provide heat to the melt as it flows from the melt passage to the gates. The distinction between a nozzle and a probe is that the melt flows through a nozzle, whereas it flows around a probe. An example of a configuration using a heated probe is shown in the applicant's Canadian patent number 1,198,266 which issued Dec. 24, 1985. While injection molding molds can have various configurations with numerous plates for different applications, the term "cavity insert" is used herein to indicate any plate or member through which the gate extends to the cavity, although in many other applications it may be called a cavity plate.

In configurations having heated nozzles abutting against the heated manifold, it is also known to mount a hot tip seal at the forward end of each nozzle. Examples of this in which the hot tip seal has a central pin portion or shaft in alignment with the gate are shown in the applicant's U.S Pat. No. 4,279,588 which issued Jul. 21, 1981 and U.S. Pat. No. 4,450,999 which issued May 29, 1984 as well as U.S. Pat. No. 4,266,723 to Osuna-Diaz which issued May 12, 1981. Similarly, the applicant's U.S. Pat. No. 4,810,184 which issued Mar. 7, 1989 and U.S. Pat. No. 5,028,227 which issued Jul. 2, 1991 show an unheated ribbed torpedo assembly mounted between the forward end of each nozzle and a gate insert. However, all of these prior arrangements have the disadvantage that separate nozzles or probes having their own electrical heating element are required in addition to the heated manifold. Also, the requirement of nozzles or probes extending from the manifold limits reduction in mold height, which has become an important consideration in many applications.

The applicant's U.S. Pat. No. 4,303,382 which issued Dec. 1, 1981 discloses a heated nozzle having a forward tip portion with spiral channels which extend around a valve pin to impart a swirling motion to the melt flowing into the cavity. Similarly, the apparatus described in the applicant's Canadian patent number 1,165,525 which issued Apr. 17, 1984 requires a heated nozzle having spiral blades to impart a swirling motion to the melt. Thus, all of the above prior apparatus has the disadvantages that it is relatively costly to manufacture, subject to malfunction, and requires additional mold height to install.

SUMMARY OF THE INVENTION

Accordingly, it is an object of the present invention to at least partially overcome the problems of the prior art by providing an unheated sealing and conductive member with a conductive hot tip shaft extending through an outer sealing collar mounted directly between a heated melt distribution manifold and a cooled cavity insert.

To this end, in one of its aspects, the invention provides hot tip gated injection molding apparatus having a plurality of spaced gates, each gate extending centrally from a well in a cooled cavity insert to a respective cavity, a heated melt distribution manifold having a forward face mounted with an insulative air space extending between the forward face of the heated manifold and the cooled cavity insert, and a melt passage extending from a common inlet and branching in the manifold to a plurality of branches, each branch having a portion which extends forwardly to an outlet on the forward face of the manifold in alignment with one of the gates, having the improvement wherein a sealing and conductive member having a plurality of spaced ribs which connect an elongated central conductive hot tip shaft to a surrounding outer sealing collar portion is mounted between the heated manifold and the cooled cavity insert in alignment with each of the gates, the outer collar portion having a rear end, a forward end, and a central bore wherethrough melt from the melt passage flows around the hot tip shaft to the gate, the outer collar portion bridging the insulative air space between the heated manifold and the cooled cavity insert with the rear end of the collar portion abutting against the forward face of the heated manifold and the forward end of the collar portion being seated in the well in the cavity insert, the hot tip shaft having a rear end and a forward end, the rear end of the shaft extending rearwardly past the rear end of the collar portion through the outlet on the forward face of the manifold a predetermined distance into the forwardly extending portion of a respective one of the melt passage branches, the forward end of the shaft being pointed and extending forwardly past the forward end of the collar portion a predetermined distance into the well in the cavity insert in alignment with the gate.

Further objects and advantages of the invention will appear from the following description, taken together with the accompanying drawings.

DETAILED DESCRIPTION OF THE DRAWINGS

Figure 1:
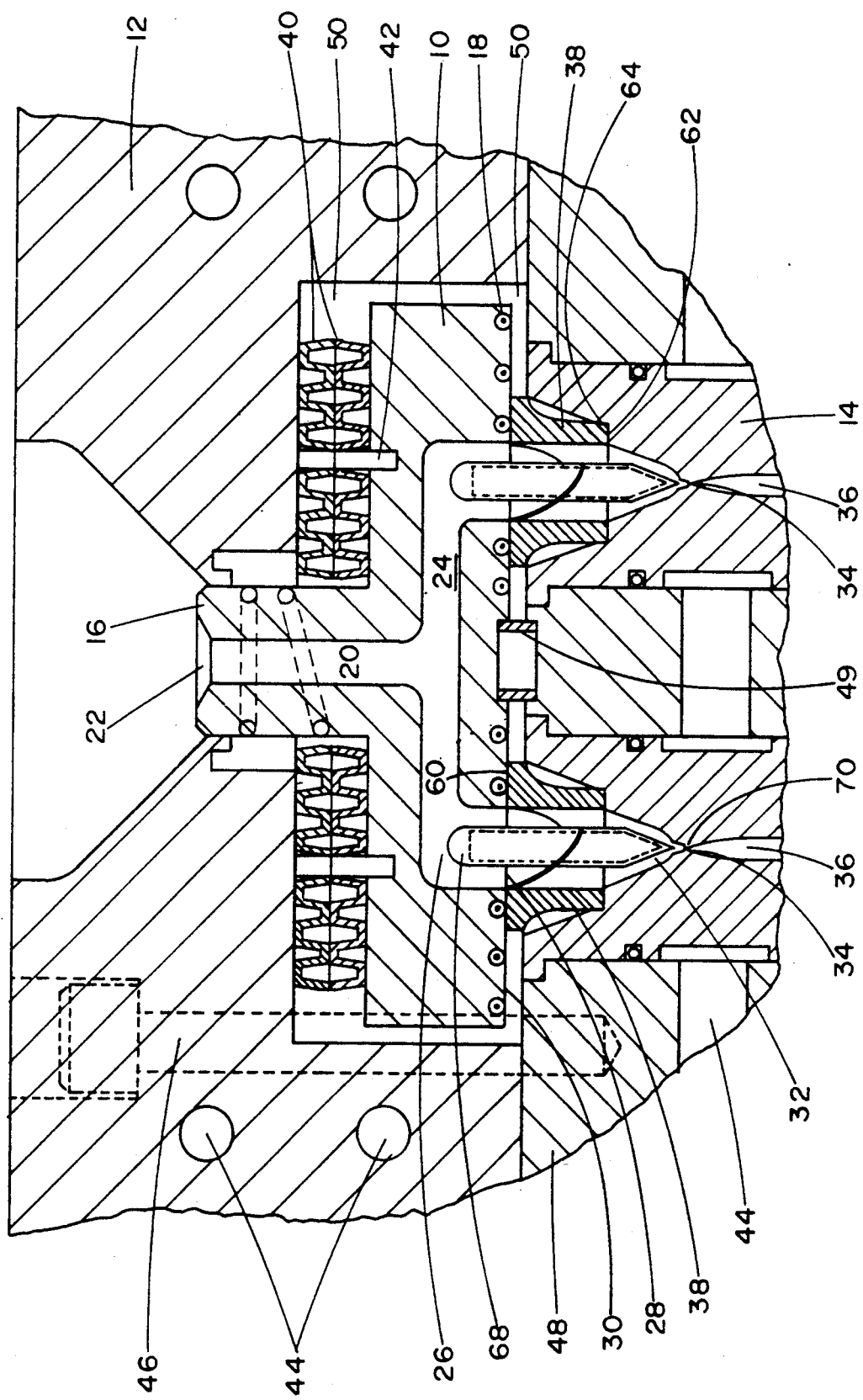
FIG. 1 is a sectional view of a multi-cavity injection molding system having sealing and conductive members mounted against the melt distribution manifold according to a preferred embodiment of the invention.

Reference is first made to FIG. 1 which shows a heated melt distribution manifold 10 mounted between a cooled back plate 12 and a cooled cavity insert 14. The manifold 10 has a cylindrical inlet portion 16 and an electrical heating element 18 as described in U.S. Pat. No. 5,142,126 entitled "Injection Molding Manifold with Integral Heated Inlet Portion." A melt passage 20 extends from a common inlet 22 in the inlet portion 16 and branches to a number of branches 24. Each branch 24 of the melt passage 20 has a forwardly extending portion 26 which leads to an outlet 28 on the forward face 30 of the manifold 10.

The cavity insert 14 has a well 32 with a central gate 34 leading to a cavity 36 in alignment with each outlet 28. As described in more detail below, a sealing and conductive member 38 according to the invention is mounted directly between the heated manifold 10 and the cooled cavity insert 14 in alignment with each of the aligned outlets 28 and gates 34. Double insulative and resilient spacer members 40 as described in U.S. Pat. No. 5,125,827 entitled "Injection Molding Insulative and Resilient Spacer Member" are located between the manifold 10 and the back plate 12 by screws 42. The back plate 12 and the cavity insert 14 are cooled by pumping cooling water through cooling conduits 44. The back plate 12 is secured in position by retaining bolts 46 which extend into a cavity insert retainer plate 48 The back plate 12 applies a force through the spacer members 40 and the heated manifold 10 which holds the sealing and conductive members 38 securely in position. A central locating ring 49 is seated between the heated melt distribution manifold 10 and the cooled cavity insert retainer plate 48. Thus, the heated melt distribution manifold 10 is located in a position which provides an insulative air space 50 between it and the surrounding cooled back plate 12 and cooled cavity insert 14. As is well known, this provides considerable thermal separation by minimizing actual steel to steel contact between the heated and cooled components of the mold.

Figure 2:
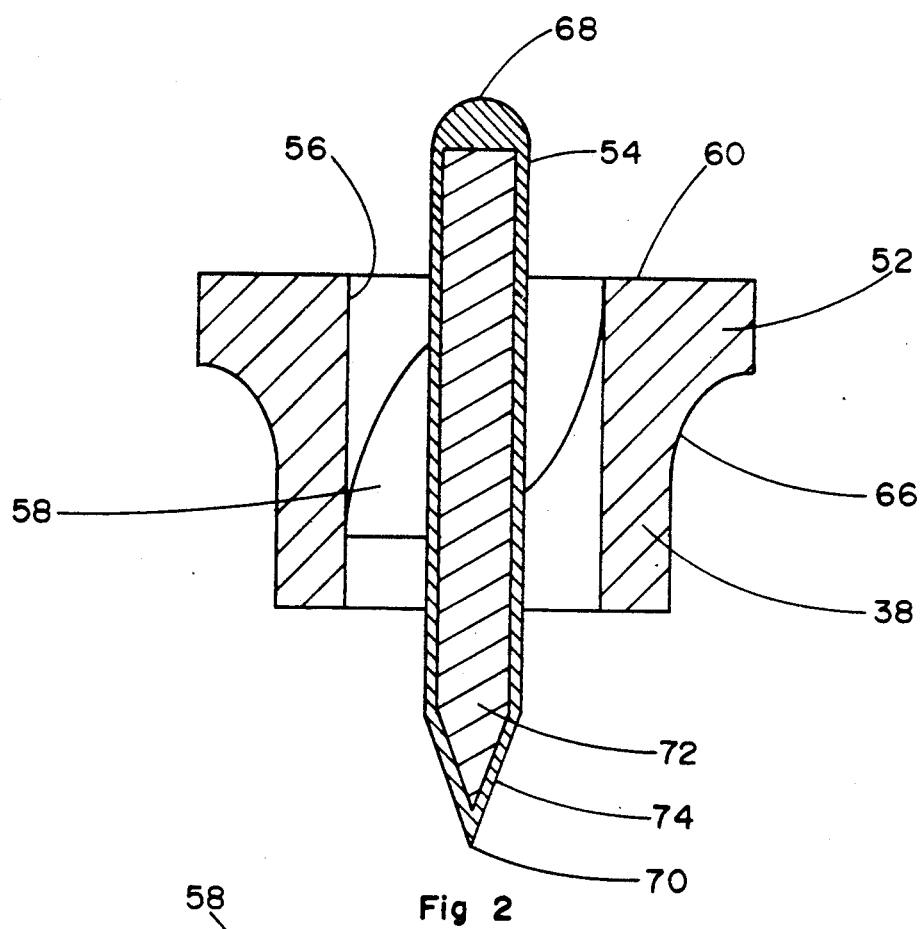
FIG. 2 is a partial isometric view of one of the sealing and conductive members seen in FIG. 1.
Figure 3:
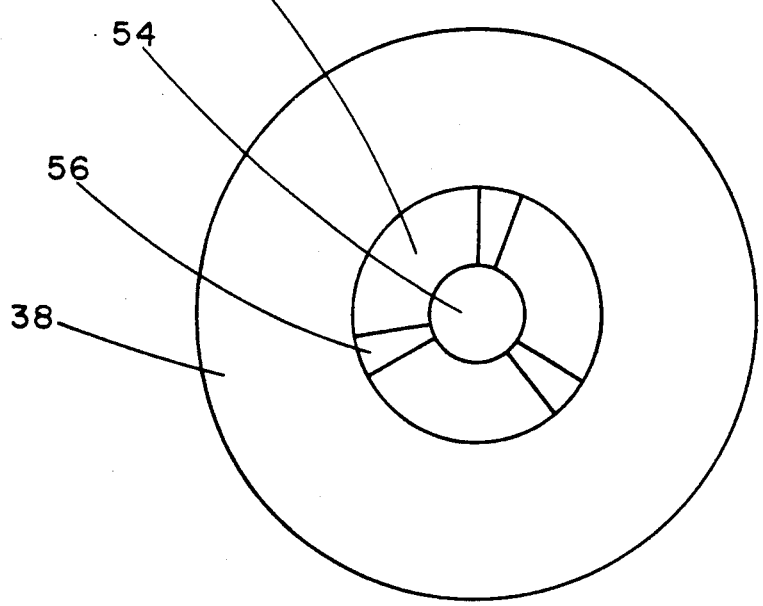
FIG. 3 is a plan view of the sealing and conductive member seen in FIG. 2.

Reference is now also made to FIGS. 2 and 3 which show the integral sealing and conductive member 38 in more detail. Each sealing and conductive member 38 has an outer sealing collar portion 52 and an elongated conductive hot tip shaft 54 which extends centrally through the bore 56 of the outer collar portion 52. A number of spaced ribs or blades 58 connect the collar portion 52 and the hot tip shaft 54 together. The collar portion 52 has a rear end 60 and a forward end 62. As seen in FIG. 1, the rear end 60 abuts against the forward face 30 of the manifold 10, and the forward end 62 is received in a seat 64 in the well 32 in the cavity insert 14. Thus, the collar portion 52 provides a seal against leakage of the pressurized melt into the insulative air space 50 between the hot manifold 10 and cooled cavity insert 14. The force from the retaining bolts 46 is sufficient to eliminate leakage, but the rear end 60 of the collar portion 52 and the forward face 30 of the manifold 10 are sufficiently flat to allow adequate sliding movement between them to accommodate thermal expansion. In this embodiment, a portion 66 of the outer surface of the collar portion 52 curves outwardly towards the rear. Thus, the collar portion 52 is thicker at the rear end 60 where it extends into the air space 50 and contacts the forward face 30 of the heated manifold 10 than at the forward end 62 where it is received in the seat 64 in the cooled cavity insert 14. This increases the heat received through the rear end 60 from the heated manifold 10 and reduces the heat loss through the forward end 62 to the cooled cavity insert 14. As can be seen, the rear end 60 of the collar portion 52 is directly adjacent the heating element 18 in the forward face 30 of the manifold which also improves the heat transfer from that forward face 30 to the collar portion 52. The thermal conductivity of the sealing and conductive members 38 is critical to the successful operation of the system because they do not have a separate heating element. Thus, the shape, dimensions and composition of the different portions can be varied to provide different thermal characteristics for different applications.

The elongated hot tip shaft 54 of the sealing and conductive member 38 extends centrally in the bore 56 of the collar portion 52, but is considerably longer than the collar portion 52. Thus, the rear end 68 of the hot tip shaft 54 which is smoothly rounded in this embodiment extends rearwardly past the rear end 60 of the collar portion 52 through the outlet 28 and centrally into the forwardly extending portion 26 of the melt passage 20. Similarly, the forward end 70 of the hot tip shaft 54 which has a pointed tip extends forwardly past the forward end 62 of the collar portion 52 centrally into the well 32 in alignment with the gate 34. The pointed tip 70 of the hot tip shaft 54 usually extends into the gate 34 itself which is also tapered, but its precise location is determined by the thermal requirements of the particular application. As best seen in FIG. 2, the hot tip shaft 54 has an inner portion 72 surrounded by a thin outer portion 74. The inner portion 72 is made of a highly thermally conductive material such as silver or copper, and the outer portion 74 is made of an abrasion and corrosion resistant material such as high speed steel. Thus, the outer portion 74 is able to withstand wear from the pressurized melt flowing around it, particularly in the area of the gate 34 and the inner portion 72 very effectively conducts heat to and from the area of the gate 34 during different portions of the injection cycle.

As can be seen, in this embodiment three spiral blades 58 extend outwardly from the hot tip shaft 54 to connect it to the surrounding collar portion 52. These blades 58 are smoothly curved to avoid dead spots and minimize turbulence in the melt which flows between them around the hot tip shaft 54. The spiral shape of the blades 58 imparts a swirling motion to the melt entering the cavity 36 which strengthens the molded product around the gate area. In applications where this is not a concern, the sealing and conductive members 38 can have straight ribs or vanes which extend radially rather than the spiral blades 58. Thus, the number and shape of the blades or ribs 58 are dependent upon the requirements of the particular application. In this embodiment, the outer collar portion 52 and blades 58 are cast of hotwork steel and are integrally brazed to the hot tip shaft 54. Thus, a metallurgically monolithic integral sealing and conductive member 38 is formed which effectively conducts heat from the rear end 60 of the collar portion 52 through the blades 58 as well as along the elongated hot tip shaft 54.

In use, the injection molding system is assembled as shown in FIG. 1. While a system having only two cavities 36 has been shown for ease of illustration, it will be appreciated that the melt distribution manifold 10 normally has many more melt passage branches 24 extending to numerous cavities 36 depending on the application. Electrical power is applied to the heating element 18 in the manifold 10 to heat it to a predetermined operating temperature. Pressurized melt from a molding machine (not shown) is then injected into the melt passage 20 through the common inlet 22 according to a predetermined cycle in a conventional manner. The pressurized melt flows into the forwardly extending portions 26 of the branches 24 of the melt passage 20 and through the sealing and conductive members 38 to the gates 34 to fill the cavities 36. After the cavities 36 are filled, injection pressure is held momentarily to pack and then released. After a short cooling period, the mold is opened to eject the molded products. After ejection, the mold is closed and injection pressure is reapplied to refill the cavities 36. This cycle is continuously repeated with a frequency dependent on the size and shape of the cavities and the type of material being molded. During injection the hot tip shaft 54 conducts excess heat which is generated by friction of the melt flowing through the constricted area of the gate 34 rearwardly to avoid stringing and drooling of the melt when the mold opens for ejection. After melt has stopped flowing, solidification in the gate is enhanced by the removal of the excess friction heat through the hot tip shaft 54. Shortly after the excess friction heat has been removed, the direction of flow of heat along the hot tip shaft 54 reverses. Heat received from the heated manifold 10 through the rear end 60 of the collar portion 52 and also from the rear end 68 of the hot tip shaft 54 which extends into the hot melt in the melt passage 20 in the heated manifold 10 is conducted forwardly along the hot tip shaft 54 to the area of the gate 34. This additional heat prevents the melt freezing in the area of the gate 34 to the extent that it forms a solid plug which would interfere with injection when injection pressure is reapplied after the mold is closed.

While the description of the sealing and conductive members 38 has been given with respect to preferred embodiments, it will be evident that various modifications are possible without departing from the scope of the invention as understood by those skilled in the art and as defined in the following claims.

The embodiments of the invention in which an exclusive property or privilege is claimed is defined as follows:

1. In a hot tip gated injection molding apparatus having a plurality of spaced gates, each gate extending centrally from a well in a cooled cavity insert to a respective cavity, a heated melt distribution manifold having a forward face mounted with an insulative air space extending between the forward face of the heated manifold and the cooled cavity insert, and a melt passage extending from a common inlet and branching in the manifold to a plurality of branches, each branch having a portion which extends forwardly to an outlet on the forward face of the manifold in alignment with one of the gates, the improvement wherein:

a sealing and conductive member having a plurality of spaced ribs which connect an elongated central conductive hot tip shaft to a surrounding outer sealing collar portion is mounted between the heated manifold and the cooled cavity insert in alignment with each of the gates, the outer collar portion having a rear end, a forward end, and a central bore wherethrough melt from the melt passage flows around the hot tip shaft to the gate, the outer collar portion bridging the insulative air space between the heated manifold and the cooled cavity insert with the rear end of the collar portion abutting against the forward face of the heated manifold and the forward end of the collar portion being seated in the well in the cavity insert, the hot tip shaft having a rear end and a forward end, the rear end of the hot tip shaft extending rearwardly past the rear end of the collar portion through the outlet on the forward face of the manifold a predetermined distance into the forwardly extending portion of a respective one of the melt passage branches, the forward end of the hot tip shaft being pointed and extending forwardly past the forward end of the collar portion a predetermined distance into the well in the cavity insert in alignment with the gate.

2. Hot tip gated injection molding apparatus as claimed in claim 1 wherein the hot tip shaft has a highly thermally conductive inner portion and an abrasion resistant outer portion.

3. Hot tip gated injection molding apparatus as claimed in claim 2 wherein the outer portion of the hot tip shaft is formed of high speed steel.

4. Hot tip gated injection molding apparatus as claimed in claim 3 wherein the inner portion of the hot tip shaft is formed of silver.

5. Hot tip gated injection molding apparatus as claimed in claim 3 wherein the inner portion of the hot tip shaft is formed of copper.

6. Hot tip gated injection molding apparatus as claimed in claim 2 wherein the spaced ribs connecting the central hot tip shaft to the surrounding outer collar portion have the shape of spiral blades which impart a swirling motion to the melt flowing between them to the gate.

7. Hot tip gated injection molding apparatus as claimed in claim 2 wherein the outer collar portion is substantially thicker at the rear end than at the forward end.

8. Hot tip gated injection molding apparatus as claimed in claim 2 wherein the rear end of the collar portion and the forward face of the manifold against which the rear end of the collar portion abuts are sufficiently flat to allow sufficient relative movement therebetween to provide for thermal expansion.

* * * * *